May 30, 1967 G. J. VOGEL 3,323,128
MULTIPLE TARGET TRACKING SYSTEM
Filed Sept. 1, 1964 3 Sheets-Sheet 1

INVENTOR.
GEORGE J. VOGEL

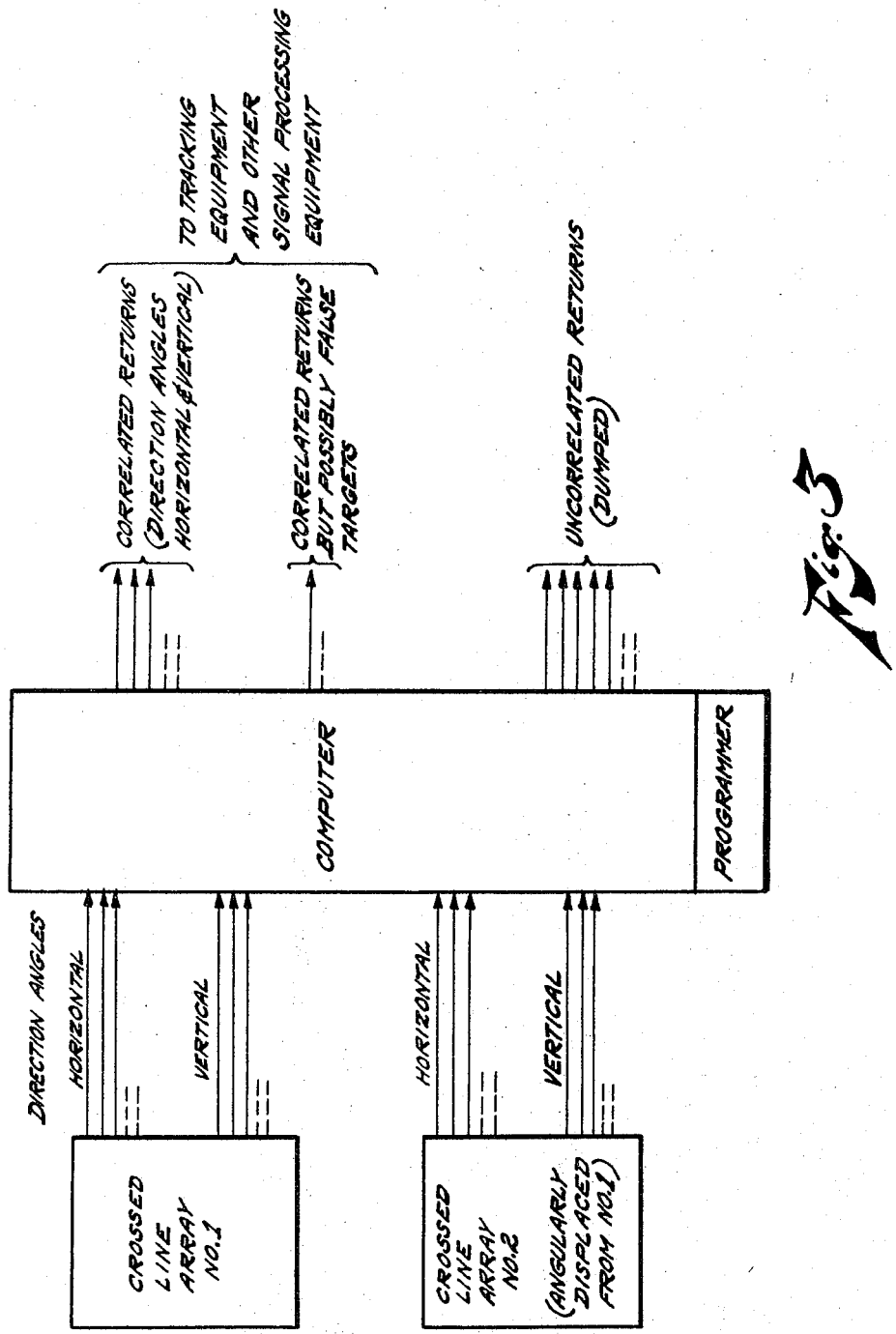

May 30, 1967 G. J. VOGEL 3,323,128
MULTIPLE TARGET TRACKING SYSTEM
Filed Sept. 1, 1964 3 Sheets-Sheet 3

INVENTOR.
GEORGE J. VOGEL
BY
ATTORNEY
AGENT

United States Patent Office 3,323,128
Patented May 30, 1967

---

3,323,128
MULTIPLE TARGET TRACKING SYSTEM
George J. Vogel, Blossvale, N.Y., assignor to the United States of America as represented by the Secretary of the Air Force
Filed Sept. 1, 1964, Ser. No. 393,797
1 Claim. (Cl. 343—113)

The invention described herein may be manufactured and used by or for the United States Government for governmental purposes without payment to me of any royalty thereon.

This invention relates to multiple-target tracking systems, and more particularly to correlation of multiple-target radar echoes through the utilization of two or more crossed line arrays angularly displaced.

Use of line arrays of antenna elements for receiving radar echo signals is well known in the prior art. One detailed description of a line array is presented in "Proceedings of the IRE, vol. 6, January 1958, pp. 67–84, entitled: "A High Resolution Radio Telescope for Use at 3.5 M." by B. Y. Mills et al., describing a radio telescope wherein each array comprises 500 half-wave dipole elements arranged in two parallel rows, each 125 wavelengths long.

A single line array locates a target in only one angular dimension which corresponds to the azimuth angle in mechanical radars. A second line array at right angles to the first line array locates a target also in only one angular dimension; this one, however, corresponds to the elevation angle of mechanical radars. These two angles describe the target direction.

A second target is located in a similar manner. However, if the radar (crossed line arrays) detects both targets at the same time, the radar becomes confused as to which direction angle found by one line array goes with one of the direction angles determined by the second line array. This results in a correlation problem.

Accordingly, the principal object of this invention is to provide method and apparatus for positively identifying each target when there are multiple targets. Briefly, this object is accomplished by the utilization of at least two sets of crossed line arrays. The second set of crossed line arrays is rotated about the first set. The instant method is independent of the cross centers as long as the distance to the targets is large compared to this spacing. Each line array has multiple signal outputs to handle multiple target echoes. These signal outputs correspond to direction angles in terms of the phase gradients, and are fed to a computer where all the possible sums and differences of the horizontal phase gradients and the vertical phase gradients are made and compared to all the vertical and horizontal phase gradients from the rotated vertical line array. Where favorable comparisons are made, a correlation is made. These then, become the identified target locations and can now be used for target path computations and predictions.

Other objects, features and attendant advantages of the present system will become more apparent to those skilled in the art as the following disclosure is set forth, including a detailed description of a preferred embodiment of the invention as illustrated in the accompanying sheets of drawings in which:

FIG. 3 shows in block diagram form the utilization of a computer to process the signals from crossed sets of line arrays.

Figure 1A:
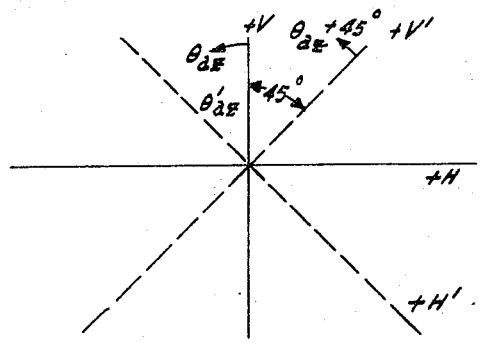
FIG. 1a illustrates a rotated crossed line.
Figure 1B:
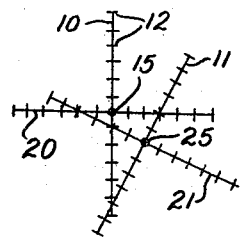
FIG. 1b illustrates a first and second pair of crossed line arrays both angularly displaced and having their centers in physically different locations.

The instant invention can be more readily understood by a consideration of the following factors:

Referring to FIG. 1a, in general, if $n$ targets are resolved angularly (all in the same range resolution block) with one line array and a second line array (at right angles to the first array, HV) resolves $m$ targets in angle, then it can be said that there are at least $m$ or $n$ (whichever is larger) targets and no more than $mn$ targets. When the angularly displaced (rotated, H'V') pairs of crossed line arrays are used only (common centers), all correlated targets that could be false will be known. FIG. 1b illustrates a first pair, 10, 20, and a second pair, 11, 21, of crossed line arrays, each array comprising a plurality of dipole antenna elements 12, which are both angularly displaced and have their centers, 15 and 25, in physically different locations.

The following statement can then be made: where a possible target location is a real target, then both sets of crossed line arrays will indicate the same location. However, there are certain conditions under which a possible target location can be identical for both sets of line arrays and not actually be a target. Displacement of the cross centers will aid in this correlation problem by use of a completely different process. Such a process is described in my co-pending application, Ser. No. 393,796, entitled: "A Multiple Target Tracking System" filed even date herewith.

When the angularly displaced (rotated) pairs of crossed line arrays are used only (common centers), all correlated targets that could be false will be known.

The following is a derivation of the equations involved. For simplicity, all arrays are assumed to be in the same horizontal plane. The second set of crossed line arrays are displaced in a clockwise direction by an angle of 45° (FIG. 1). The spacing of the elements in the first set of line arrays is equal to X. The spacing of the elements in the second set (rotated by 45°) of line arrays is $x\sqrt{2}$. The angle of rotation and spacing of elements were picked for simplicity of explanation. The equations that relate the array steering angles to elevation and azimuth angles reduce down to the following:

$$\sin \theta_{el} = \sqrt{1 - \sin^2 \theta_V - \sin^2 \theta_H}$$

and $$\cot \theta_{az} = -\frac{\sin \theta_V}{\sin \theta_H}$$

(for a horizontal array only).

The following is true whether or not the plane of the array is horizontal. If the plane of the array were not horizontal, the angles labeled elevation and azimuth would have to be called something else such as elevation and azimuth angles with respect to the plane of the array.

The elevation angle is measured from the horizontal plane and the azimuth angle is measured from some reference, in this case the positive vertical line array (see FIG. 1) and is measured in the counter clockwise direction. The spacing of elements on the H and V arrays are equal to X. The spacing of elements on the H' and V' arrays are equal to $x\sqrt{2}$. The + sign on the V and H (and V' and H') arrays indicate the direction of the positive array steering angles.

The relationship between the array steering angles and the phase gradients are:

$$\phi^V = x \sin \theta_{V_1}; \quad \phi_1^{v1} = x\sqrt{2} \sin \theta^1_{V_1}$$

$$\phi_1^H = x \sin \theta_{H_1}; \quad \phi_1^{H1} = x\sqrt{2} \sin \theta^1_{H_1}$$

The subscript 1 indicates "target" 1 of that line array, and the superscript 1 indicates the rotated line array. V and H indicate which line array and $\theta_V$ and $\theta_H$ indicate the array steering angles.

In general, the phase gradients which are known will be as follows:

$$\phi_1^V; \phi_1^H; \phi_1^{v1}; \phi_1^{H1}$$
$$\phi_2^V; \phi_2^H; \phi_2^{v1}; \phi_2^{H1}$$
$$\phi_3^V; \phi_3^H; \phi_3^{v1}; \phi_3^{H1}$$

These phase gradients are related to the direction normal to the plane of the arrays. For the normal case, $\phi$ would be zero.

The number of phase gradients in any of the above columns can be any number equal to or greater than one, but no more than the maximum number of actual targets.

In the instant case (FIG. 2) each pair of crossed line arrays indicate a possible nine targets and a minimum of three. It must be noted that the maximum number of possible targets of one set must be equal to or greater than the minimum possible number of targets of the other set.

It then follows:

$$\phi_1^V = x \sin\theta_{V_1} \text{ and } \phi_1^{v1} = x\sqrt{2}\sin\theta'_{V_1}$$
$$\phi_1^H = x \sin\theta_{H_1} \text{ and } \phi_1^{H1} = x\sqrt{2}\sin\theta'_{H_1}$$
$$\phi_2^V = x \sin\theta_{V_2} \text{ and } \phi_2^{v1} = x\sqrt{2}\sin\theta'_{V_2}$$
$$\phi_2^H = x \sin\theta_{H_2} \text{ and } \phi_2^{H1} = x\sqrt{2}\sin\theta'_{H_2}$$
$$\phi_3^V = x \sin\theta_{V_3} \text{ and } \phi_3^{v1} = x\sqrt{2}\sin\theta'_{V_3}$$
$$\phi_3^H = x \sin\theta_{H_3} \text{ and } \phi_3^{H1} = x\sqrt{2}\sin\theta'_{H_3}$$

Numbering the possible targets for the first array set follows:

No. 1—$\phi^V_1$ and $\phi^H_1$   No. 6—$\phi^V_2$ and $\phi^H_3$
No. 2—$\phi^V_1$ and $\phi^H_2$   No. 7—$\phi^V_3$ and $\phi^H_1$
No. 3—$\phi^V_1$ and $\phi^H_3$   No. 8—$\phi^V_3$ and $\phi^H_2$
No. 4—$\phi^V_2$ and $\phi^H_1$   No. 9—$\phi^V_3$ and $\phi^H_3$
No. 5—$\phi^V_2$ and $\phi^H_2$ The possible targets for the second array set are numbered similarly.

Then, the elevation and azimuth angles for target No. 1 of the first array set are $$\sin\theta_{el_1} = \sqrt{1 - \sin^2\theta_{V_1} - \sin\theta_{H_1}}$$

$$\cot\theta_{az_1} = -\frac{\sin\theta_{V_1}}{\sin\theta_{H_1}}$$

for target No. 2;

$$\sin\theta_{el_2} = \sqrt{1 - \sin^2\theta_{V_1} - \sin\theta_{H_2}}$$

$$\cot\theta_{az_2} = -\frac{\sin\theta_{V_1}}{\sin\theta_{H_2}}$$

similarly, all other targets of the first array set are found.

Similarly, the elevation and azimuth angles for target No. 1 of the second array set are:

$$\sin\theta'_{el_1} = \sqrt{1 - \sin^2\theta'_{V_1} - \sin^2\theta_{H_1}}$$

$$\cot(\theta'_{az_1} + 45°) = -\frac{\sin\theta'_{V_1}}{\sin\theta'_{H_1}}$$

for target No. 2, $$\sin\theta'_{el_2} = \sqrt{1 - \sin^2\theta'_{V_1} - \sin^2\theta_{H1}}$$

$$\cot(\theta'_{az_1} + 45°) = -\frac{\sin\theta'_{V_1}}{\sin\theta'_{H_1}}$$

Locations or possible targets Nos. 3–9 for the second array set are found similarly.

For these to be a real target, a set of $\theta_{el}$ and $\theta_{az}$ from the first array set must agree with a set of $\theta'_{el}$ and $\theta'_{az}$ from the second array set.

Starting with three phase gradients in both the vertical and horizontal dimensions of the first set of line arrays, then *all* the possible phase gradients of the rotated set in terms of the phase gradients of the first array set are:

$$\phi^V_1 + \phi^H_1; \phi^V_2 + \phi^H_1; \phi^V_3 + \phi^H_1$$
$$\phi^V_1 + \phi^H_2; \phi^V_2 + \phi^H_2; \phi^V_3 + \phi^H_2 \quad \text{vertical}$$
$$\phi^V_1 + \phi^H_3; \phi^V_2 + \phi^H_3; \phi^V_3 + \phi^H_3$$
$$\phi^H_1 - \phi^V_1; \phi^H_1 - \phi^V_2; \phi^H_1 - \phi^V_3$$
$$\phi^H_2 - \phi^V_1; \phi^H_2 - \phi^V_2; \phi^H_2 - \phi^V_3 \quad \text{horizontal}$$
$$\phi^H_3 - \phi^V_1; \phi^H_3 - \phi^V_2; \phi^H_3 - \phi^V_3$$

Note that there *could* be a total of nine phase gradients (and nine steering angles) in both line arrays of the rotated set if there were three in both line arrays of the first set. This would immediately indicate that there must be at least 9 and no more than 81 targets while the first set would indicate at least 3 and no more than 9. However, any combination could exist as long as both sets of arrays' minimums and maximums include the real number of targets.

As an example, suppose that there are only three targets and their locations for both array systems are 1; 5; and 9; then the following relationships would be true:

$$\phi_1^{V1} = \phi^V_1 + \phi_1^H; \phi_1^{H1} = \phi_1^H - \phi_1^V$$
$$\phi_2^{V1} = \phi^V_2 + \phi_2^H; \phi_2^{H1} = \phi_2^H - \phi_2^V$$
$$\phi_3^{V1} = \phi^V_3 + \phi_3^H; \phi_3^{H1} = \phi_3^H - \phi_3^H$$

The elevation and azimuth angles can now be solved for both arrays and related. It can be easily shown that for the actual target locations, these elevations and azimuth angles are exactly identical.

Which proves the obvious, that is, if there is a real target at positions No. 1 for both array systems, then both systems will correlate for that position. Similarly, every other real target will correlate at their correct positions.

The elevation and azimuth angles for all the wrong possible target locations for both array sets can be written and put in terms of one array set's steering angles and compared to find out if any false target positions could possibly correlate, but this is long and difficult.

In the example given, there are six possible target locations in both sets of arrays that could correlate. This means that there are 36 comparisons to be made. Note that originally there were 81 comparisons to be made. Once a target position correlates, the elevation and azimuth angles concerned do not have to be compared with any other. The total number of comparisons is equal to the product of the number of possible target locations for each array set. This could conceivably become an extremely large number. To determine beforehand the various possible situations where possible target positions could correlate when there is not a target could be very long. A short cut does exist however. It was found that when all the false target positions are considered, they fall in groups. Only one example from each group would have to be examined. This would reveal if any of that group could correlate.

By careful examination of the problem, it was found that in the example given, none of the wrong positions could possibly correlate.

On further examination, it was found that if one of the array sets contained 3 x 3 or 3 x 2 steering angles, then there must be at least four actual targets to enable the possibility of a false target correlation to exist. For an array set containing 4 x 4 steering angles, there must be at least 5 real targets. For 5 x 5 steering angles, there must be at least 6 real targets (for false correlations to exist). For 4 x 3 or 4 x 2, the number of real targets required is 4. For 5 x 4 or 5 x 3 or 5 x 2 the number of real targets required is 5. In all the above examples, there would be only one possible false target correlation. To have a second possible false target correlation, the number of real targets required in each of the above examples would increase by one.

So it can be seen, that for any target situation, the number of correlated target positions will determine the number of correlated positions that could be false.

As will be seen from the following, which correlated position could be false will also be known.

Figure 2:
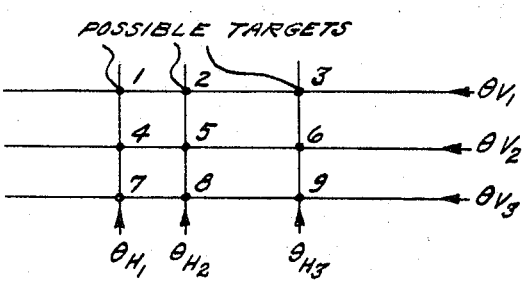
FIG. 2 depicts possible target locations for one array set.

The possible target locations in FIG. 2 are numbered for one array set which has three by three steering angles: It must be remembered that a plot of $\theta_V$ or $\theta_N$ (the target locations) on a plane parallel to the plane of the array will not in general be straight lines (only one in each dimension could be a straight line) as indicated in FIG. 2, but will be hyperbolas.

Real targets at 1 and 3 could cause a false correlation at either 5 or 8. However, there must be at least two other real targets.

The possible correlated targets (only two sets of cross line arrays) vs. pairs of actual targets are:

| Pairs of actual targets | Possible correlated targets other than the actual targets |
|---|---|
| 1 and 7 | 5 or 6 |
| 1 and 3 | 5 or 8 |
| 2 and 8 | 4 and/or 6 |
| 4 and 6 | 2 and/or 8 |
| 3 and 9 | 4 or 5 |
| 7 and 9 | 2 or 5 |
| 1 and 6 | 8 |
| 1 and 8 | 6 |
| 3 and 4 | 8 |
| 3 and 8 | 4 |
| 2 and 9 | 4 |
| 4 and 9 | 2 |
| 2 and 7 | 6 |
| 6 and 7 | 2 |

Other pairs of actual targets cannot cause correlation of false target positions.

These possibilities were determined by observation of the physical picture. A third set of crossed line arrays will change the above. It will require at least three actual targets to generate a possible false target correlation.

In the same manner, an array set that has more than 3 x 3 steering angles can also be tabulated for the possible correlated false targets. However, this is not important. After correlation, it can easily be determined which of the correlated target positions could be false. The probability is high that for two cross array sets that the minimum and maximum number of targets (before correlation) will not have a very large spread. If three cross array sets are used, the probability becomes higher, as the spread becomes less. It must be remembered that this problem exists only for multiple targets in the same pulse range resolution block (or for multiple echoes that arrive at the array in the same time interval).

A test for possible false targets after correlating is to examine each array set's correlated targets. One finds all correlated targets that would have resulted from two other targets. Then one compares these correlated targets for each array set. Any of this last group of targets that are the same for all cross array sets are the correlated targets that could either be real or false. Further elimination can be achieved by other means, such as by changing the volume being illuminated by the transmitter.

It should be noted, that actual solutions of the azimuth and elevation angles are not required to correlate the targets. For two pairs of crossed line array spaced 45° apart, it was noted that $$\phi_V' = \phi_H + \phi_V \text{ and } \phi_H' = \phi_H - \phi_V$$

When this condition is satisfied, for any pair of $\phi_V'$ and $\phi_H'$ and for any pair of $\phi_V$ and $\phi_H$, then the condition for correlation is satisfied. This includes false target correlation. For three pairs of cross line arrays the conditions change:

$$\phi_V' = a\phi_H + b\phi_V; \quad \phi_V'' = c\phi_H + d\phi_V; \quad \phi_V''' = e\phi_H' + f\phi_V'$$
$$\phi_H' = a\phi_H - b\phi_V; \quad \phi_H'' = c\phi_H - d\phi_H; \quad \phi_H''' = e\phi_H' - f\phi_V'$$

where the constants $a, b, c, d, e, f$ depend on the angular spacing of the arrays and the spacing of elements of each array pair. If the arrays were equally spaced (30°), then $a=d$, $b=c$. Actual values would then depend on the spacing of the elements in each array.

Again referring to the two pairs of crossed line arrays, for a correlation to be false, it must have resulted from four actual targets that contained the same phase gradient; one target must have contained the phase gradient $\phi_V'$, another target must have contained the phase gradient $\phi_H'$, another $\phi_H$, and another $\phi_V$. In other words, all these phase gradients must exist for a correlation, and to exist, a real target must have generated them. If the correlation is false, then they must have been generated by actual targets and each one by a different target. This then can be used for a test to determine if a correlated target could be either real or false.

It should be noted that in an actual radar case, the phase gradients will not be exactly known; in other words, the beam has a finite thickness. Each phase gradient must include its possible error when correlating. It might be better in this respect to use the steering angles instead of the phase gradients. In the above relationship a straight substitution can be made $$(\phi = x \sin \theta \text{ and } \phi' = x\sqrt{2} \sin \theta')$$

Now referring to FIG. 3, shown in block diagram form is the utilization of a computer to process in accordance with the method of the instant invention, the signals from the crossed sets to produce the desired output signals representative of individual target locations. Each line array has multiple outputs to handle multiple target echoes. These outputs are direction angles in terms of the phase gradients $\phi'$ and are fed to the computer where all the possible sums of the horizontal phase gradients ($\phi_H$) and the vertical phase gradients ($\phi_V$) are made and compared to all the vertical phase gradients ($\phi_V'$) from the rotated vertical line array. Where favorable comparisons are made, a correlation is made. Similarly, all possible differences ($\phi_H - \phi_V$) are made and compared to all the horizontal phase gradients from the rotated horizontal line array. These, then, become the correlated target locations and can now be used for path computations and predictions; for size evaluation; for range resolution and other uses.

If it is desired to determine which of the correlated target locations could be false (if any), then additional computer programming is necessary. This program would look at the phase gradients of all the correlated target locations and find the phase gradients that are repeated at least two times. As indicated heretofore, for any false correlated target to exist, there must be a repeated phase gradient for each of the four (or more if line arrays are used) line arrays $\phi_V$, $\phi_H$, $\phi_V'$ and $\phi_H'$ and these four repeated phase gradients (one from each line array) must describe the location of one correlated target. When this happens, then this is a correlated target that could be false.

In summary, the entire invention consists of the use of two or more pairs of crossed line arrays angularly displaced and the utilization of a programmed computer (analog or digital) to find the correlated positions. Each application requires a different program. The programs themselves are quite simple. For applications where there are possibilities of having a large number of multiple target echoes, then additional logic is used to reduce the number of comparisons.

Figure 4A:
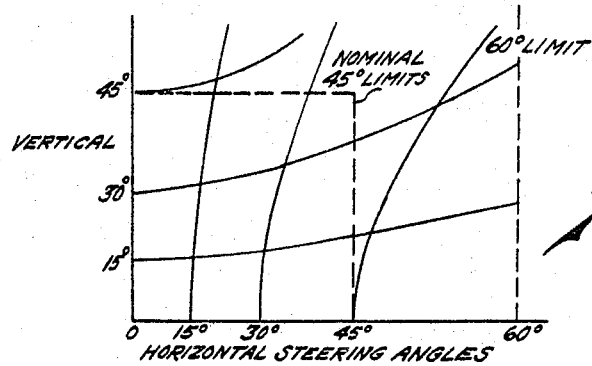
FIGS. 4a, b, and c are explanatory curves.
Figure 4B:
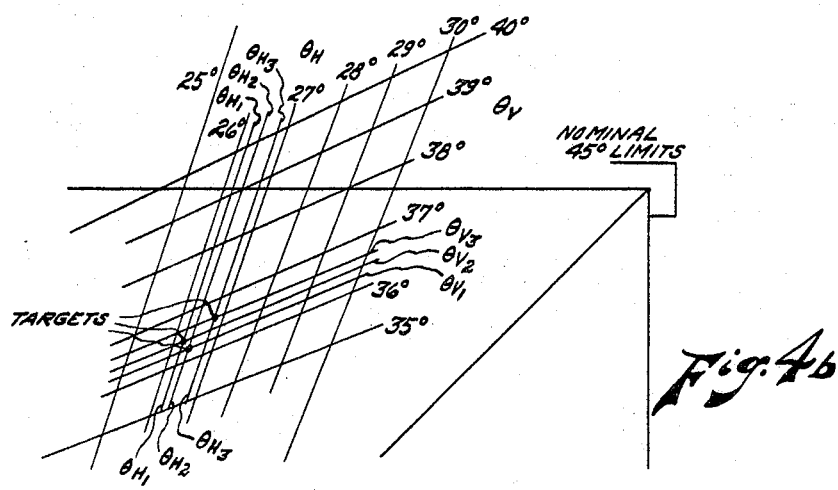
Figure 4C:
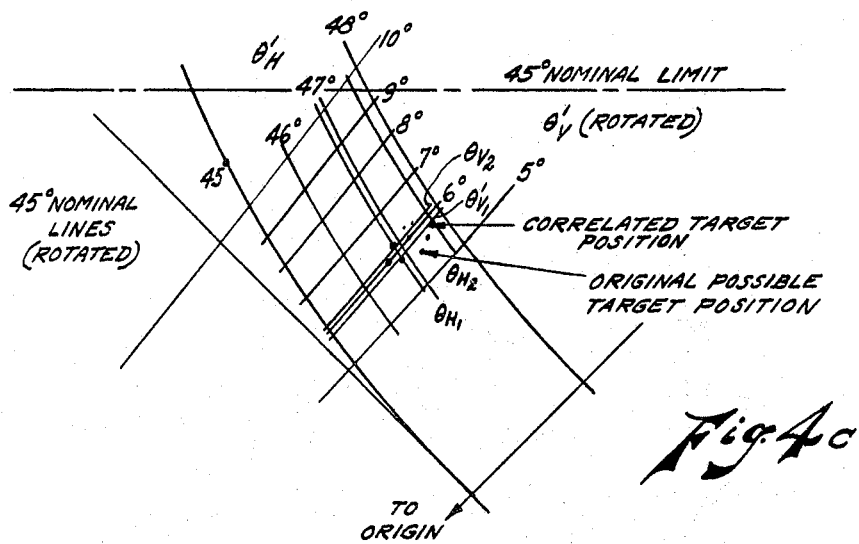

FIGS. 4a, b and c afford an additional explanation of the operation of this invention. In FIG. 4a, a plane some distance from the plane of the array and parallel to it is shown. On this plane are plotted the direction angles for both dimensions. When only one direction angle to a target has been determined, all that has been determined is that a direction line to this target or targets will pass through the curve corresponding to that angle. FIG. 4b shows an enlarged section of FIG. 4a. If two direction angles $\theta_{V_1}$ and $\theta_{H_2}$ are determined, then this fixes the target direction as the intersection of these two curves. If, however, there were three targets whose directions were determined by the three intersections accentuated in the drawing, then the direction angles $\theta_{V_1}$, $\theta_{V_2}$, $\theta_{V_3}$, $\theta_{H_1}$, $\theta_{H_2}$ and $\theta_{H_3}$ would have been found. When a direction angle is determined, the number of targets that have this direction angle has not been determined other than there be at least one target with this direction angle. Therefore, it would not be known if there were targets at the other intersections. All that would be known is that there are at least three and no more than nine targets. The instant invention obviates this dilemma by using a rotated set of arrays instead of the original. The new axis chosen here has been rotated 45°; this results in new direction angles. FIG. 4c shows the same enlarged section as FIG. 4b with the same targets. It is to be noted that the new direction curves are aligned differently than the originals. This results in different locations of the intersections except for the three intersections representing the three actual target directions. FIG. 4a can be used for the rotated axis if the figure is rotated 45°.

This is a rather simple illustration of this correlation technique. Targets are correlated only when both sets of line arrays agree to the same target locations. This agreement can be expressed in a simple set of equations that can easily be solved in a computer.

It will be appreciated, of course, by those skilled in the art, that the foregoing disclosure relates only to a detailed preferred embodiment of the invention. For example, by having the cross centers of both sets of crossed line arrays in a different location (maximum spacing approximately equal to the array dimensions), an additional correlation function exists.

Accordingly, it is intended and it is to be understood, that within the scope of the appended claim, the invention may be practiced than as otherwise described.

What is claimed is:

Apparatus for correlating multiple target radar echoes comprising a plurality of antenna elements capable of receiving radar echo signals from each of said targets, said antenna elements arranged in a line array, a second line array crossed at right angles with said first line array to form a first fixed set of crossed line arrays, said set having a common center antenna element, a second fixed set of crossed line arrays also having a common center element, angularly displaced from said first fixed set, and means for comparing in a predetermined manner signals, representative of all possible spatial locations of said targets, received from said first and second fixed sets to produce signals representative of the true location of each of said multiple targets.

References Cited

UNITED STATES PATENTS 2,245,660  6/1941  Feldman et al. ____ 343—100.6 X
2,415,088  2/1947  Dingley.

RODNEY D. BENNETT, *Primary Examiner.*

CHESTER L. JUSTUS, *Examiner.*

D. C. KAUFMAN, B. L. RIBANDO,
*Assistant Examiners.*